(12) United States Patent
Chung (10) Patent No.: US 7,861,280 B2
(45) Date of Patent: Dec. 28, 2010

(54) DATA STRUCTURE FOR APPLICATION INFORMATION TABLE, METHODS OF TRANSMITTING AND RECEIVING BROADCAST SIGNAL, AND DIGITAL TELEVISION RECEIVER

(75) Inventor: Young Tae Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 944 days.

(21) Appl. No.: 11/146,117

(22) Filed: Jun. 7, 2005

(65) Prior Publication Data
US 2006/0095952 A1 May 4, 2006

(30) Foreign Application Priority Data
Nov. 3, 2004 (KR) .................. 10-2004-0088677

(51) Int. Cl.
H04N 7/16 (2006.01)
H04N 7/173 (2006.01)
H04N 7/10 (2006.01)
H04N 7/025 (2006.01)

(52) U.S. Cl. .................. 725/142; 725/32; 725/105; 725/134; 725/135; 725/136

(58) Field of Classification Search .................. 725/39, 725/50, 131, 151; 707/100, 101, 102, 104.1
See application file for complete search history.

(56) References Cited

U.S. PATENT DOCUMENTS

| | | | |
|---|---|---|---|
| 5,331,450 A | 7/1994 | Heep et al. | |
| 5,386,251 A | 1/1995 | Movshovich | |
| 5,500,691 A | 3/1996 | Martin et al. | |
| 5,818,441 A * | 10/1998 | Throckmorton et al. | 715/717 |
| 6,133,910 A | 10/2000 | Stinebruner | |
| 6,628,344 B1 | 9/2003 | Weber | |
| 6,784,804 B1 | 8/2004 | Hayes et al. | |
| 6,850,286 B2 | 2/2005 | Burghard | |
| 6,937,972 B1 | 8/2005 | Van Ee | |
| 7,042,366 B1 | 5/2006 | Mui et al. | |
| 7,095,456 B2 | 8/2006 | Nakajima | |
| 7,218,243 B2 | 5/2007 | Hayes et al. | |
| 7,342,966 B2 * | 3/2008 | Lepine et al. | 375/240.24 |
| 7,376,964 B1 * | 5/2008 | Kim | 725/50 |
| 2001/0011940 A1 | 8/2001 | Williams et al. | |
| 2002/0059588 A1 | 5/2002 | Huber et al. | |
| 2002/0097165 A1 | 7/2002 | Hulme | |
| 2003/0189509 A1 | 10/2003 | Hayes et al. | |
| 2003/0197625 A1 | 10/2003 | Szuba | |
| 2003/0217369 A1 * | 11/2003 | Heredia | 725/152 |
| 2004/0119894 A1 | 6/2004 | Higgins et al. | |
| 2004/0179142 A1 | 9/2004 | Fang | |

(Continued)

FOREIGN PATENT DOCUMENTS

JP 4-83474 3/1992
KR 10-20010064517 A 7/2001

*Primary Examiner*—Dominic D Saltarelli
(74) *Attorney, Agent, or Firm*—McKenna Long & Aldridge LLP (57) ABSTRACT

An application information table (AIT) includes a set of application information which is associated with a particular broadcast application. The set of application information includes a first data field indicating whether the data broadcast application is a program-bound application. A digital broadcast transmitter transmits a digital broadcast signal including the application information table (AIT) to a digital broadcast receiver, which then reads the first data field included in the set of application information to determine a program binding status of the data broadcast application.

21 Claims, 11 Drawing Sheets

| | No. of Bits | identifier |
|---|---|---|
| application_information_section () { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   application_type | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_use | 4 | bslbf |
|   common_descriptors_length | 2 | uimsbf |
|   for (i=0; i<N; i++) { | | |
|     descriptor() | | |
|   } | | |
|   reserved_future_use | 4 | bslbf |
|   application_loop_length | 12 | uimsbf |
|   for (i=0; i<N; i++) { | | |
|     application_identfier() | | |
|     application_control_code | 8 | uimsbf |
|     application_dependency_type | 4 | bslbf |
|     application_descriptors_loop_length | 12 | uimsbf |
|     for (j=0; j<N; j++) { | | |
|       descriptor() | | |
|     } | | |
|   } | | |
|   CRC_32 | 32 | Rpchof |
| } | | |

U.S. PATENT DOCUMENTS

| | | |
|---|---|---|
| 2004/0266419 A1 | 12/2004 | Arling et al. |
| 2005/0005288 A1 | 1/2005 | Novak |
| 2005/0024226 A1 | 2/2005 | Hayes et al. |
| 2005/0102699 A1 | 5/2005 | Kim et al. |
| 2005/0219424 A1 | 10/2005 | Ryu |
| 2005/0285750 A1 | 12/2005 | Hayes et al. |
| 2006/0053444 A1 | 3/2006 | Rudolph et al. |
| 2006/0087445 A1 | 4/2006 | Green |
| 2006/0110129 A1* | 5/2006 | Hamada ............ 386/83 |
| 2006/0125651 A1 | 6/2006 | Cosmao et al. |
| 2006/0259184 A1 | 11/2006 | Hayes et al. |
| 2007/0296552 A1 | 12/2007 | Huang et al. |

* cited by examiner

FIG. 1

|  | No. of Bits | identifier |
|---|---|---|
| application_information_section () { |  |  |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   application_type | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_use | 4 | bslbf |
|   common_descriptors_length | 2 | uimsbf |
|   for (i=0; i<N; i++) { |  |  |
|     descriptor() |  |  |
|   } |  |  |
|   reserved_future_use | 4 | bslbf |
|   application_loop_length | 12 | uimsbf |
|   for (i=0; i<N; i++) { |  |  |
|     application_identfier() |  |  |
|     application_control_code | 8 | uimsbf |
|     reserved_future_use | 4 | bslbf |
|     application_descriptors_loop_length | 12 | uimsbf |
|     for (j=0; j<N; j++) { |  |  |
|       descriptor() |  |  |
|     } |  |  |
|   } |  |  |
|   CRC_32 | 32 | Rpchof |
| } |  |  |

FIG. 2

| Descriptor Name | Descriptor Tag |
|---|---|
| Application descriptor | 0×00 |
| Application name descriptor | 0×01 |
| Transport descriptor | 0×02 |
| DVB-J application decriptor | 0×03 |
| DVB-J application location decriptor | 0×04 |
| External application authorization descriptor | 0×05 |
| Routing descriptor IPv4 | 0×06 |
| Routing descriptor IPv6 | 0×07 |
| DVB-HTML application descriptor | 0×08 |
| DVD-HTML application location descriptor | 0×09 |
| DVB-HTML application boundary descriptor | 0×0A |
| Application icons descriptor | 0×0B |
| Pre-fetch descriptor | 0×0C |
| Dll location descriptor | 0×0D |
| Reserved to MHP for future use | 0×0E~0×5E |
| Private data specifier descriptor | 0×5F |

FIG. 3

|  | No. of Bits | identifier |
|---|---|---|
| application_information_section () { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   application_type | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_use | 4 | bslbf |
|   common_descriptors_length | 2 | uimsbf |
|   for (i=0; i<N; i++) { | | |
|     descriptor() | | |
|   } | | |
|   reserved_future_use | 4 | bslbf |
|   application_loop_length | 12 | uimsbf |
|   for (i=0; i<N; i++) { | | |
|     application_identfier() | | |
|     application_control_code | 8 | uimsbf |
|     application_dependency_type | 4 | bslbf |
|     application_descriptors_loop_length | 12 | uimsbf |
|     for (j=0; j<N; j++) { | | |
|     descriptor() | | |
|     } | | |
|   } | | |
|   CRC_32 | 32 | Rpchof |
| } | | |

FIG. 4

| application_dependency_type | description |
|---|---|
| 0×1 | Program unbound data application |
| 0×2 | Program bound data application |
| 0×0, 0×3~0×F | reserved_future_use |

FIG. 5

| Descriptor Name | Descriptor Tag |
|---|---|
| Application descriptor | 0×00 |
| Application name descriptor | 0×01 |
| Transport descriptor | 0×02 |
| DVB-J application decriptor | 0×03 |
| DVB-J application location decriptor | 0×04 |
| External application authorization descriptor | 0×05 |
| Routing descriptor IPv4 | 0×06 |
| Routing descriptor IPv6 | 0×07 |
| DVB-HTML application descriptor | 0×08 |
| DVD-HTML appication location descriptor | 0×09 |
| DVB-HTML application boundary descriptor | 0×0A |
| Application icons descriptor | 0×0B |
| Pre-fetch descriptor | 0×0C |
| Dll location descriptor | 0×0D |
| Application dependency type descriptor | 0×0E |
| Reserved to MHP for future use | 0×0F~0×5E |
| Private data specifier descriptor | 0×5F |

FIG. 6

|  | No. of Bits | Identifier |
|---|---|---|
| application_dependency_type_descriptor () { | | |
|    descriptor_tag | 8 | uimsbf |
|    descriptor_length | 8 | uimsbf |
|    appication_dependency_type | 8 | uimsbf |
| } | | |

FIG. 7A

|  | No. of Bits | identifier |
|---|---|---|
| application_descriptor () { |  |  |
|    descriptor_tag | 8 | uimsbf |
|    descriptor_length | 8 | uimsbf |
|    application_profiles_length | 8 | uimsbf |
|    for (i=0; i<N; i++) { |  |  |
|       application_profile | 16 | uimsbf |
|       version.major | 8 | uimsbf |
|       version.minor | 8 | uimsbf |
|       version.micro | 8 | uimsbf |
|    } |  | bslbf |
|    service_bound_flag | 1 | bslbf |
|    visibility | 2 | bslbf |
|    reserved_future_use | 5 | uimsbf |
|    application_priority | 8 |  |
|    for (i=0; i<N; i++) { |  |  |
|       transport_protocol_label | 8 | uimsbf |
|    } |  |  |
| } |  |  |

FIG. 7B

|  | No. of Bits | identifier |
|---|---|---|
| application_descriptor () { |  |  |
|    descriptor_tag | 8 | uimsbf |
|    descriptor_length | 8 | uimsbf |
|    application_profiles_length | 8 | uimsbf |
|    for (i=0; i<N; i++) { |  |  |
|       application_profile | 16 | uimsbf |
|       version.major | 8 | uimsbf |
|       version.minor | 8 | uimsbf |
|       version.micro | 8 | uimsbf |
|    } |  | bslbf |
|    service_bound_flag | 1 | bslbf |
|    visibility | 2 | bslbf |
|    application_dependency_type | 5 | uimsbf |
|    application_priority | 8 |  |
|    for (i=0; i<N; i++) { |  |  |
|       transport_protocol_label | 8 | uimsbf |
|    } |  |  |
| } |  |  |

DATA STRUCTURE FOR APPLICATION INFORMATION TABLE, METHODS OF TRANSMITTING AND RECEIVING BROADCAST SIGNAL, AND DIGITAL TELEVISION RECEIVER

This application claims the benefit of the Korean Application No. 10-2004-0088677, filed on Nov. 3, 2004, which is hereby incorporated by reference as if fully set forth herein.

BACKGROUND OF THE INVENTION

1. Field of the Invention

The present invention relates to a data broadcast receiving/transmitting system, and more particularly, to for a data structure for an application information table (AIT), methods of transmitting and receiving a digital broadcasting signal, and a digital television (DTV) receiver.

2. Discussion of the Related Art

Recently, data broadcasting has been viewed as the latest state-of-the-art technology in the related field. More specifically, data broadcasting refers to a technology allowing daily information (or everyday life information), such as broadcast program information, weather forecast, daily news, traffic information, to be transmitted and also enabling the use of the Internet and E-commerce via a broadcasting network. In the Republic of Korea, for example, experimental broadcasting for ground wave (or terrestrial) digital broadcasting is currently being performed through the national broadcast channels: Korean Broadcasting System (KBS), the Munwha Broadcasting Corporation (MBC), Seoul Broadcasting System (SBS), and Educational Broadcasting System (EBS). Most particularly, KBS is planning to air formal (or actual and non-experimental) data broadcast programs during the first half of next year (2006). Also, in the cable industry, with the application of the OpenCable Application Platform (OCAP) in the leading cable companies Broadband Solutions, Inc. (BSI) and the Korea Digital Media Center (KDMC), full-scale broadcast services of data broadcasting is anticipated.

The data broadcasting consists of broadcasting (or transmitting) a current data (i.e., an application) in a Moving Picture Experts Group-2 (MPEG-2) transport stream along with audio and video data. Moreover, the application is differentiated by various data broadcasting standards, such as a Digital Video Broadcasting-Multimedia Home Platform (DVB-MHP) adopted in Europe, Open Cable Application Platform (OCAP) adopted in North America for cable channels, and an Advanced Television Systems Committee-Advanced Common Application Platform (ATSC-ACAP) adopted in North America for terrestrial (or ground wave) channels. In the above-described standard, the application type simply allows a receiving terminal to determine by itself whether the receiving terminal has the ability to operate the corresponding application. More specifically, the application type simply notifies (or indicates) the receiving terminal whether the application is a Java Xlet application requiring a Java Virtual Machine or a Digital Video Broadcasting-Hyper-Text Markup Language (DVB-HTML)-based or an extensible DTV Markup Language (XDML)-based application requiring a browser.

SUMMARY OF THE INVENTION

Accordingly, the present invention is directed to a data structure for an application information table, methods of transmitting and receiving a broadcast signal, and a digital television receiver that substantially obviate one or more problems due to limitations and disadvantages of the related art.

An object of the present invention is to provide a data structure for an application information table (AIT) which is able to indicate whether a data broadcast application is bound to a broadcast program or independent of any broadcast program.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a data structure for an application information table (AIT) for use in a broadcasting system, wherein the data structure includes a set of application information associated with a data broadcast application, wherein the set of application information includes a first data field indicating whether the data broadcast application is a program-bound application.

In another aspect of the present invention, a method of transmitting a digital broadcast signal in a digital broadcast transmitter includes generating an application information table (AIT) comprising a set of application information associated with a data broadcast application, wherein the set of application information includes a first data field indicating whether the data broadcast application is a program-bound application, and transmitting a digital broadcast signal to at least one digital broadcast receiver, the digital broadcast signal including the application information table (AIT).

In another aspect of the present invention, a method of receiving a digital broadcast signal in a digital broadcast receiver includes receiving a digital broadcast signal including an application information table (AIT) from a transmitter, the application information table (AIT) comprising a set of application information associated with a data broadcast application, wherein the set of application information includes a first data field indicating whether the data broadcast application is a program-bound application, and reading the first data field included in the set of application information to determine whether the data broadcast application is bound to a specific broadcast program.

In a further aspect of the present invention, a digital television (DTV) receiver includes a tuner configured to receive a digital broadcast signal, a demodulator configured to demodulate the digital broadcast signal, a demultiplexer configured to demultiplex the demodulated signal into audio streams, video streams, and supplemental data streams, and a data processor configured to read an application information table (AIT) from the demultiplexed supplemental data streams, the application information table (AIT) comprising a set of application information associated with a data broadcast application, wherein the set of application information includes a first data field indicating whether the data broadcast application is a program-bound application.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

The present invention is characteristic in creating and transmitting data broadcasting type indicating information that can indicate whether a data broadcast application is a program-bound application or a program-unbound application (independent data broadcast application). There may be diverse methods for creating the data broadcasting type indicating information. However, in the description of present invention, the method will be described according to first, second, and third embodiments of the present invention.

In the method according to the first embodiment, an identification information for indicating (or distinguishing) a program-unbound data broadcast application and a program-bound data broadcast application by using a reserved (or unused) field within an Application Information Table (AIT) is written (or created) and transmitted. In the method according to the second embodiment, a new descriptor is first defined in the AIT and, then, an identification information for indicating (or distinguishing) a program-unbound data broadcast application and a program-bound data broadcast application is written (or created) in the newly defined descriptor and transmitted. Finally, in the method according to the third embodiment, an identification information for indicating (or distinguishing) a program-unbound data broadcast application and a program-bound data broadcast application is written (or created) and transmitted by using an Application descriptor, which is the given example of one of the descriptors defined within the AIT.

More specifically, the present invention is based upon an Application Information Table (AIT) written in the ACAP standard, which is a middleware platform for receiving the terrestrial data broadcasting adopted in North America, the OCAP standard, which is a middleware platform for receiving the cable data broadcasting adopted in North America, and the MHP standard, which is a middleware platform for receiving the data broadcasting adopted in Europe. The AIT refers to a table in which applications of the data broadcasting and related information are written and described. Moreover, the contents of the AIT have first been defined by the MHP standard, which have also been adopted and partially modified by the ACAP and OCAP standards. The AIT syntax of the MHP standard will now be described with reference to FIG. 1.

Figure 1:
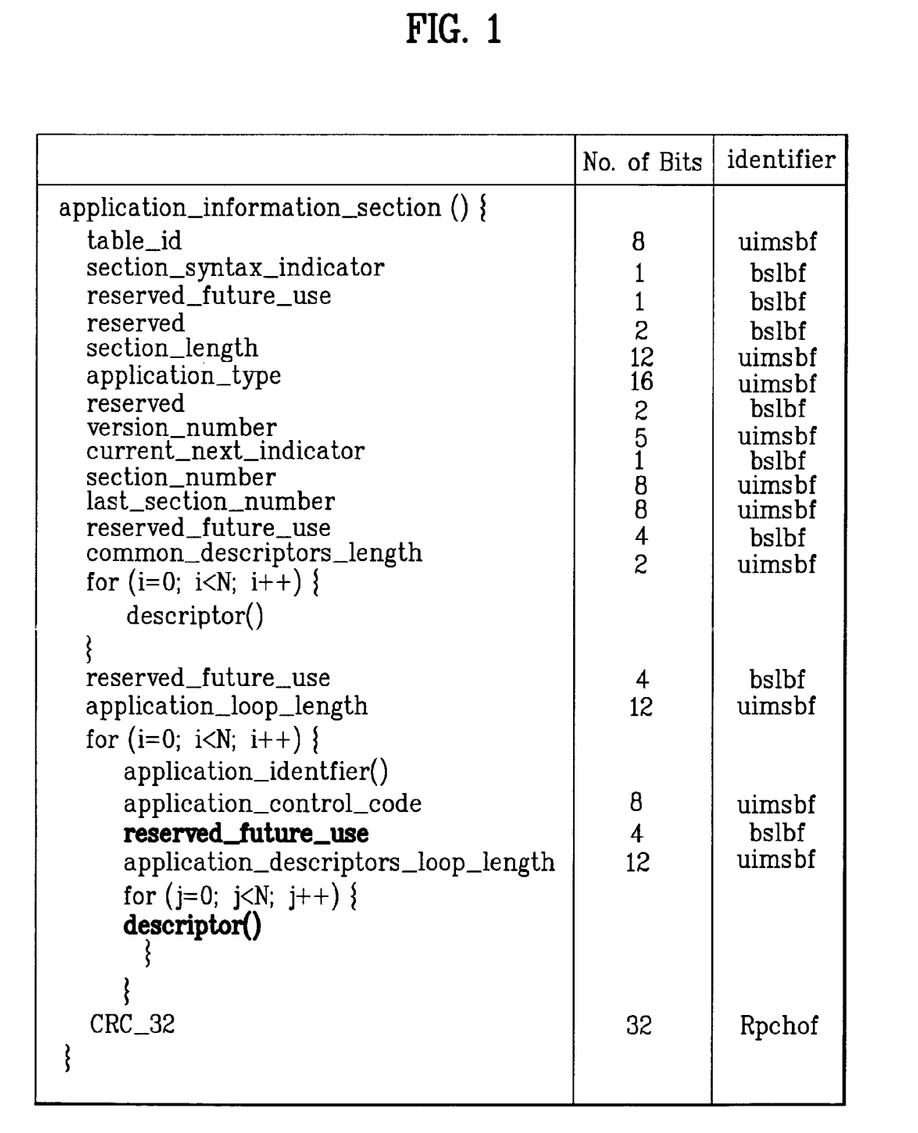
FIG. 1 illustrates an example of a general AIT syntax.

Referring to FIG. 1, a table_id field describes an ID assigned to the AIT. An application_type field is written in a corresponding AIT sub table, which indicates whether the application is a DVB-J application or a DVB-HTML application. A common_descriptor_length field represents the total length of the following descriptors of a FOR loop (or statement) in byte units. In other words, the common_descriptor_length field represents the total length of the descriptors within the FOR loop. An application_loop_length field indicates the total length of the following FOR loop including the application information in byte units, and an application_control_code field represents a status of the corresponding application. Finally, an application_descriptor_loop_length field indicates a total length of the descriptors within the following FOR loop in byte units. The descriptors within the FOR loop are applied to a standard application.

Figure 2:
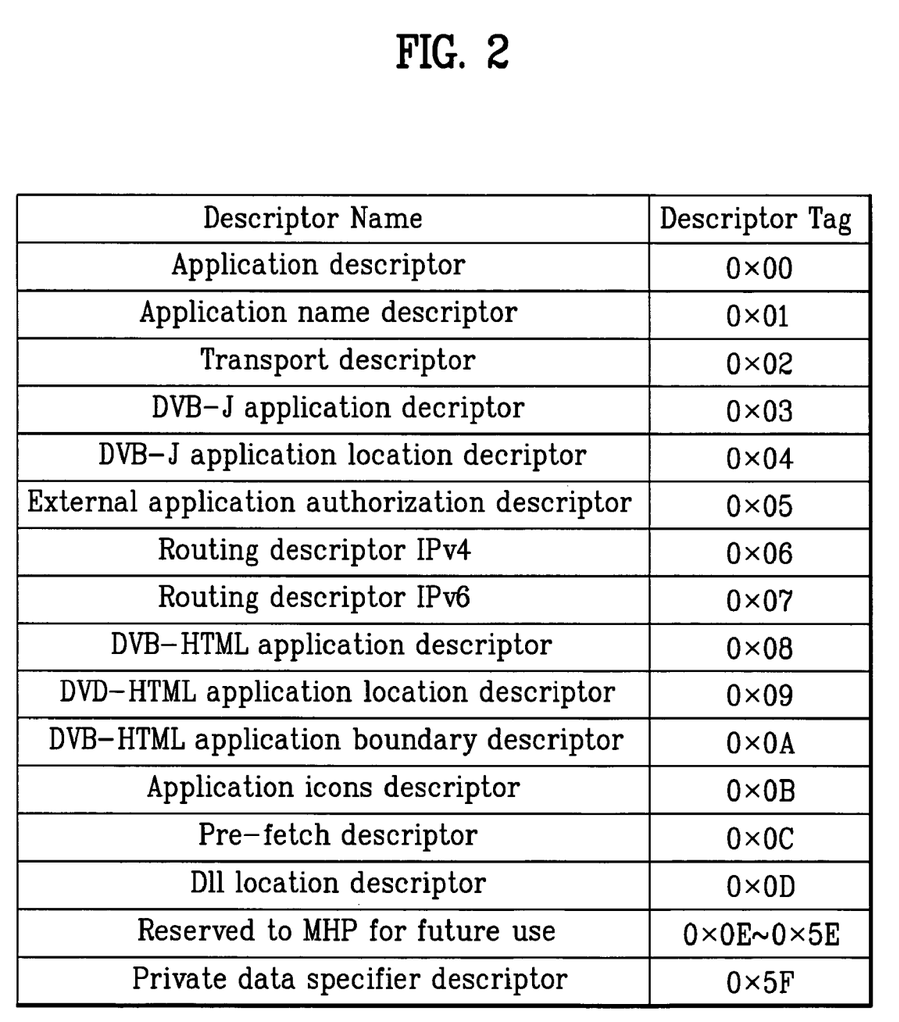
FIG. 2 illustrates an example of types and tag values of a plurality of descriptors used in the AIT of a general MHP.

FIG. 2 illustrates an example of types and tag values of a plurality of descriptors used in the AIT of a general MHP. For example, an Application descriptor is assigned with a descriptor tag value of 0x00, and an Application name descriptor is assigned with a descriptor tag value of 0x01. In addition, among the descriptor tag values, 0x0E to 0x5E are spare values reserved for future usage, and which are presently not used.

First Embodiment

According to the first embodiment of the present invention, an identification information for indicating (or distinguishing) whether a data broadcast application is an independent data broadcast application (program-unbound) or a dependent data broadcast application (program-bound) by using a reserved (or unused) field (i.e., a reserved_future_use field) within an Application Information Table (AIT) is written (or created) and transmitted. The reserved field is a field that has been presently left unused and available for when a new field is required to be added. In the first embodiment of the present invention, among the reserved fields within the AIT shown in FIG. 1, an example of using a reserved field of 4 bits is described, wherein the reserved field is located between the application_control_code field and the application_descriptor_loop_length field.

Figure 3:
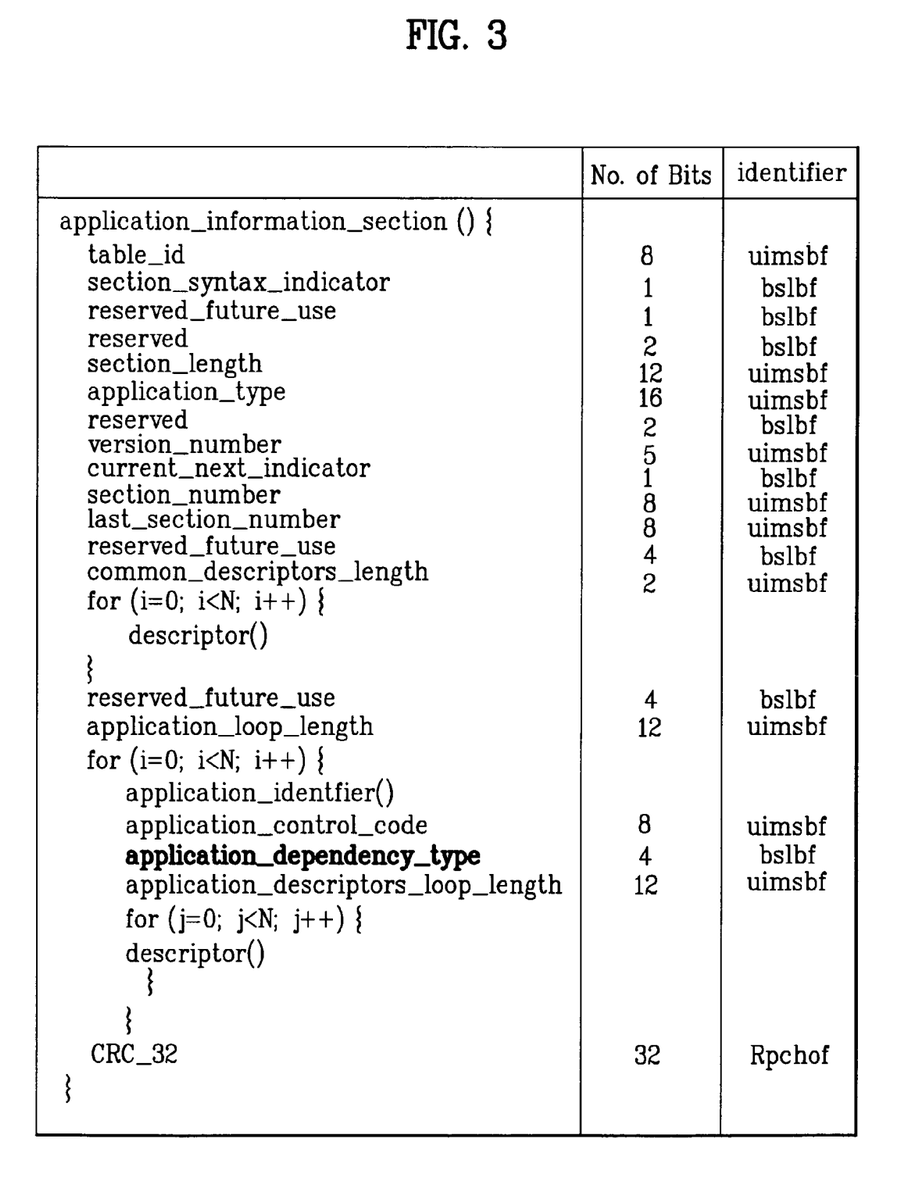
FIG. 3 illustrates an example of an AIT syntax according to a first embodiment of the present invention.
Figure 4:
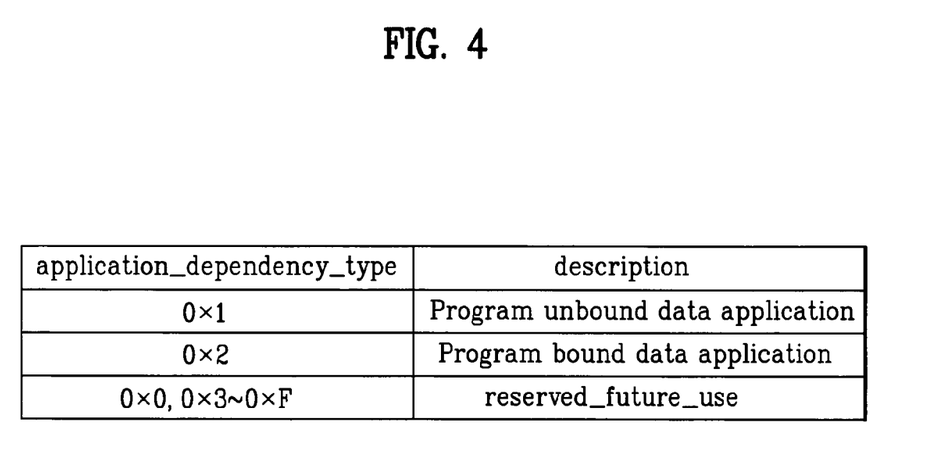
FIG. 4 illustrates an example of a content defined in an application_dependency_type field value of FIG. 3.

More specifically, in the first embodiment of the present invention, the name of the reserved field is defined as shown in FIG. 3 (e.g., application_dependency_type field), and the identification information indicating whether a data broadcast application is a program-bound application is written within the defined field. In other words, the application_dependency_type field indicates whether the received data broadcast application is bound to a specific broadcast program or is independent of any broadcast program. FIG. 4 illustrates an example of values defined in the application_dependency_type field. When the application_dependency_type field value is 0×1, the corresponding data broadcast application is a program-unbound application (independent application), and when the application_dependency_type field value is 0×2, the data broadcast application is a program-bound application.

Meanwhile, in the first embodiment according to the present invention, only 1 bit, instead of the 4 bits of the reserved (or unused) field, can be allocated to the application_dependency_type field, so as to indicate (or distinguish) the data broadcast application type. In this case, when the application_dependency_type field value is equal to '0', the application may be set as a program-unbound type. And, when the application_dependency_type field value is equal to '1', the application may be set as a program-bound type. Alternatively, type settings may also be reversed. Furthermore, instead of 1 bit or 4 bits, 2 bits or 3 bits may also be used. Therefore, when the application_dependency_type field within the AIT is parsed, a receiving end is able to determine whether the data broadcasting being received is a program-bound application or a program-unbound application.

A program-bound application is an application which is bound to a broadcast program, examples of which are actor/actress, director, synopsis, genre, production date, production location, depicted date, depicted location, episode or series number, and many other information associated with a particular broadcast program. In contrast, a program-unbound application (independent application) is an application which is independent of any broadcast program, examples of which are news, weather forecast, stock, and many other information which could be provided to TV viewers independently.

Furthermore, when the contents-based data broadcasting type are indicated (or distinguished) as described above, the application data broadcasting can be distinguished and stored as a program-unbound type or a program-bound type. In case of the program-unbound data broadcasting type, only the data may be stored from the receiver and viewed separately in a later process. And, in case of the program-bound data broadcasting type, the related audio/video/data may be stored collectively. Additionally, the user may set up the program-unbound data broadcasting and the program-bound data broadcasting in accordance with the user's preference, thereby viewing only the program-unbound type (or the program-bound type) data. Herein, the method of using the data broadcasting determined based on the contents may be diversely applied by the system designer (or author). Thus, the applications will not be limited to the above-described example.

Second Embodiment

In the method according to the second embodiment, a new descriptor is first defined in the AIT and, then, an identification information for indicating (or distinguishing) a program-unbound data broadcast application and a program-bound data broadcast application is written (or created) in the newly defined descriptor and transmitted. More specifically, in the AIT of FIG. 1, a descriptor( ) may be located in two positions. One of the positions is a descriptor following the common_descriptors_length field of FIG. 1, wherein the descriptor is commonly applied to all of the applications described in the AIT. This is also referred to as an outer descriptor. The other one of the positions is a descriptor following the application_descriptors_loop_length field, wherein the descriptor is individually applied to each of the applications. This is also referred to as an inner descriptor.

Figure 5:
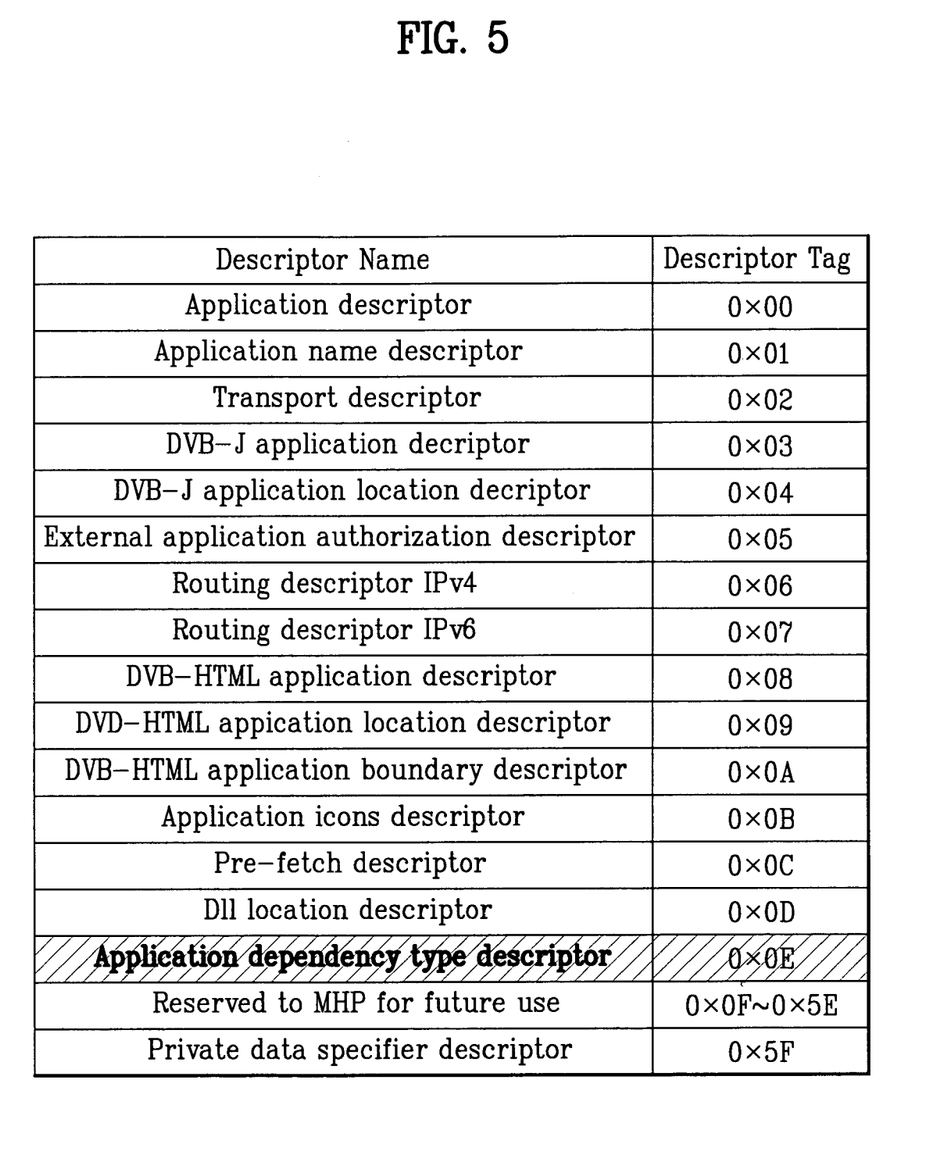
FIG. 5 illustrates an example of types and tag values of a plurality of descriptors used in the AIT of an MHP according to a second embodiment of the present invention.

In the present invention, the descriptor that is to be newly defined and added is a type of inner descriptor. Herein, when a descriptor is to be newly defined and added in the AIT, a descriptor tag should first be assigned and registered to the newly defined descriptor. Referring to FIG. 5, one of 0×0E to 0×5E is to be given as an example of a reserved (or unused) tag value. Herein, in the description of the embodiment that will follow, 0×0E will be given as an example of the tag value for the newly added descriptor. The newly added descriptor will be referred to as an Application dependency type descriptor, and an Application dependency type descriptor( ) syntax will be defined as shown in FIG. 6.

Figure 6:
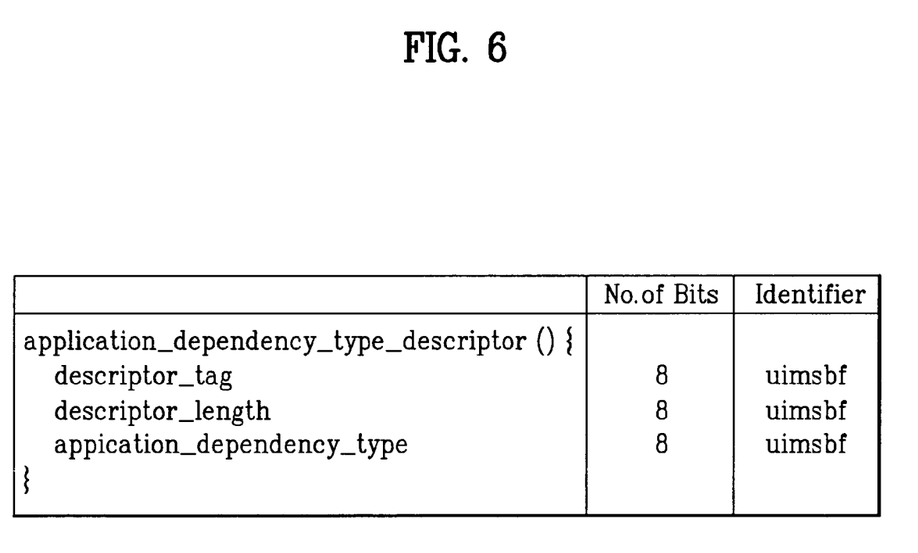
FIG. 6 illustrates an example of a syntax of a newly defined application dependency type according to the second embodiment of the present invention.

In the Application dependency type descriptor( ) syntax of FIG. 6, detailed information of the application_dependency_type field may be defined similarly as that of FIG. 4. More specifically, the receiver parses the application_dependency_type field of the Application dependency type descriptor( ) syntax within the received AIT. And, the receiver determines the data broadcast application type as a program-unbound data broadcasting application, when the field value is 0×01, and determines the data broadcast application as a program-bound data broadcasting application, when the field value is 0×02. The second embodiment is only another preferred embodiment of the present invention, and therefore other values may be assigned in order to determine the type of the data broadcasting application. Similarly, the method of using the data broadcasting determined based on the contents may be diversely applied by the system designer (or author). Such examples are identical to the examples described in the first embodiment, and so the description of the same will be omitted for simplicity.

Third Embodiment

In the method according to the third embodiment, an identification information for indicating (or distinguishing) a program-unbound data broadcast application and a program-bound data broadcast application is written (or created) and transmitted by using a descriptor among a plurality of pre-defined descriptors within the AIT. In the third embodiment of the present invention, an Application descriptor( ) will be given as an example of one of the pre-defined descriptors.

The Application descriptor( ) is to be inserted in each application within an Inner descriptor loop. Herein, the Application descriptor( ) contains basic information of each application. The Application descriptor( ) includes diverse information such as application version information and information on service bound availability and priority. Referring to FIG. 5, 0×00 is assigned as the descriptor tag number of the Application descriptor( ). In the present invention, a reserved field is used to describe whether the corresponding data broadcast application is a program-unbound type or a program-bound type.

Figure 7A:
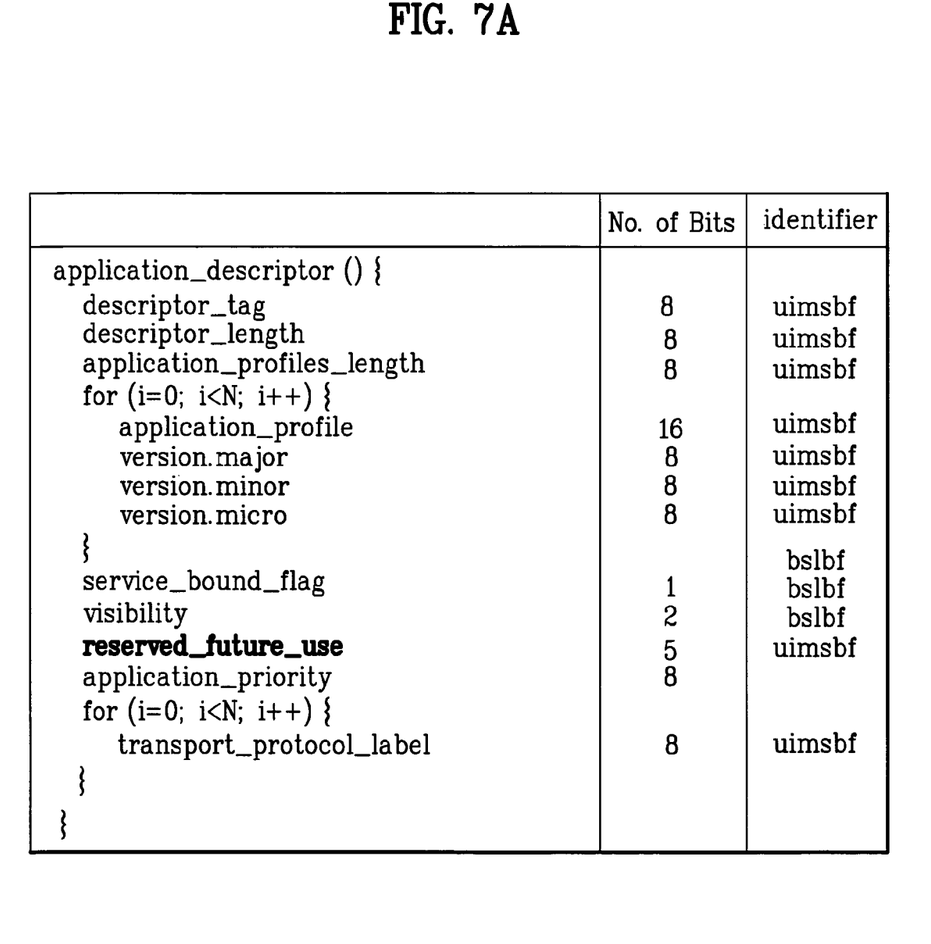
FIG. 7A illustrates an example of a general application descriptor syntax.
Figure 7B:
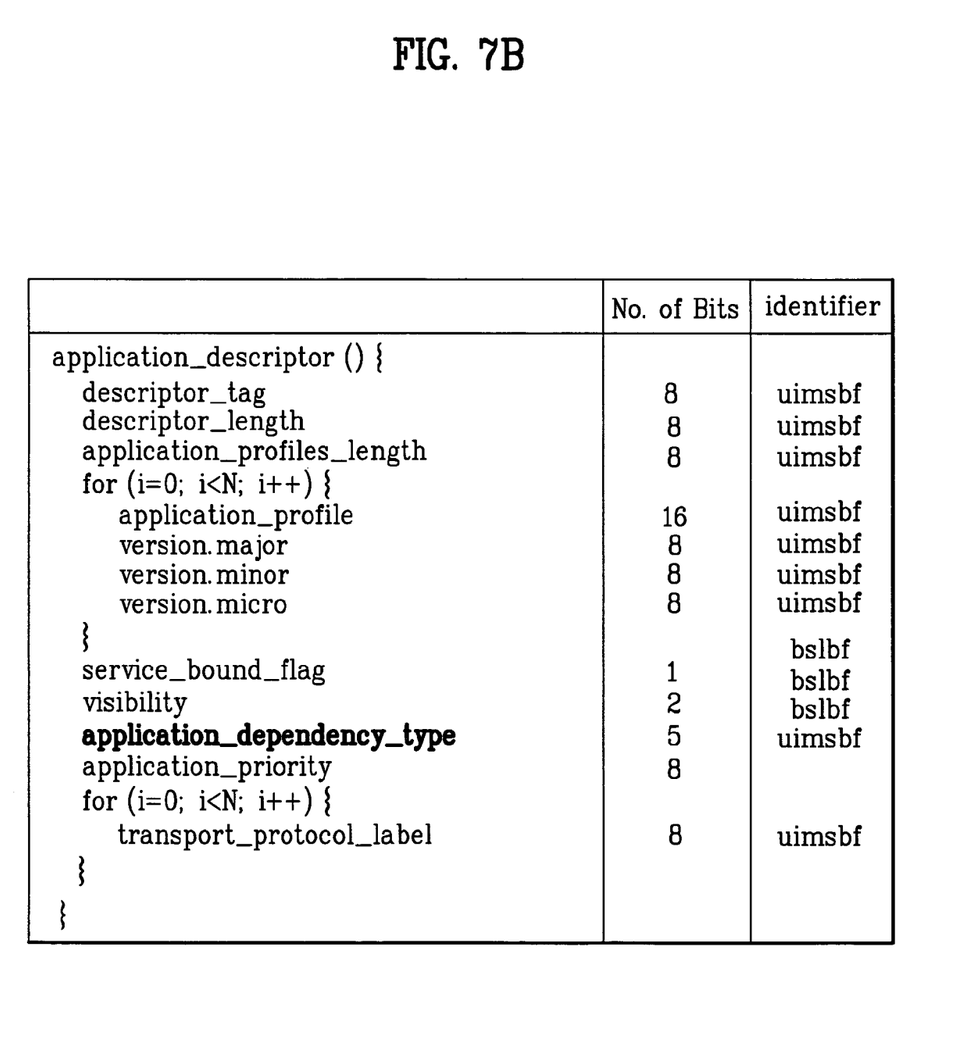
FIG. 7B illustrates an example of an application descriptor syntax according to a third embodiment of the present invention.

FIG. 7A illustrates an example of the conventional Application descriptor( ) syntax, and FIG. 7B illustrates an example of the Application descriptor( ) syntax according to the third embodiment of the present invention. Referring to FIGS. 7A and 7B, the reserved field located between the visibility field and the application_priority field is referred to as an application_dependency_type field. Herein, the application_dependency_type field describes an identification information, which indicates (or distinguishes) the program-unbound data broadcast application and the program-bound data broadcasting application. In other words, the application_dependency_type field indicates whether the received data broadcast application is a program-unbound type or a program-bound type.

Also, in the third embodiment of the present invention, detailed information on the application_dependency_type field may be defined similarly as that of FIG. 4. More specifically, the receiver parses the application_dependency_type field of the Application descriptor( ) syntax within the received AIT. And, the receiver determines the data broadcast application as a program-unbound data broadcasting application, when the field value is 0×1, and determines the data broadcast application as a program-bound data broadcasting application, when the field value is 0×2. At this point, in the third embodiment according to the present invention, only 1 bit, instead of the 5 bits of the reserved (or unused) field, can be allocated to the application_dependency_type field, so as to indicate (or distinguish) the data broadcast application type. In this case, when the application_dependency_type field value is equal to '0', the application may be set as a program-unbound type. And, when the application_dependency_type field value is equal to '1', the application may be set as a program-bound type. Alternatively, type settings may also be reversed. Furthermore, instead of 1 bit or 4 bits, any one of 2 bits to 3 bits may also be used. Similarly, the method of using the data broadcasting, which is determined based on the contents, may be diversely applied by the system designer (or author). Such examples are identical to the examples described in the first embodiment, and so the description of the same will be omitted for simplicity.

Figure 8:
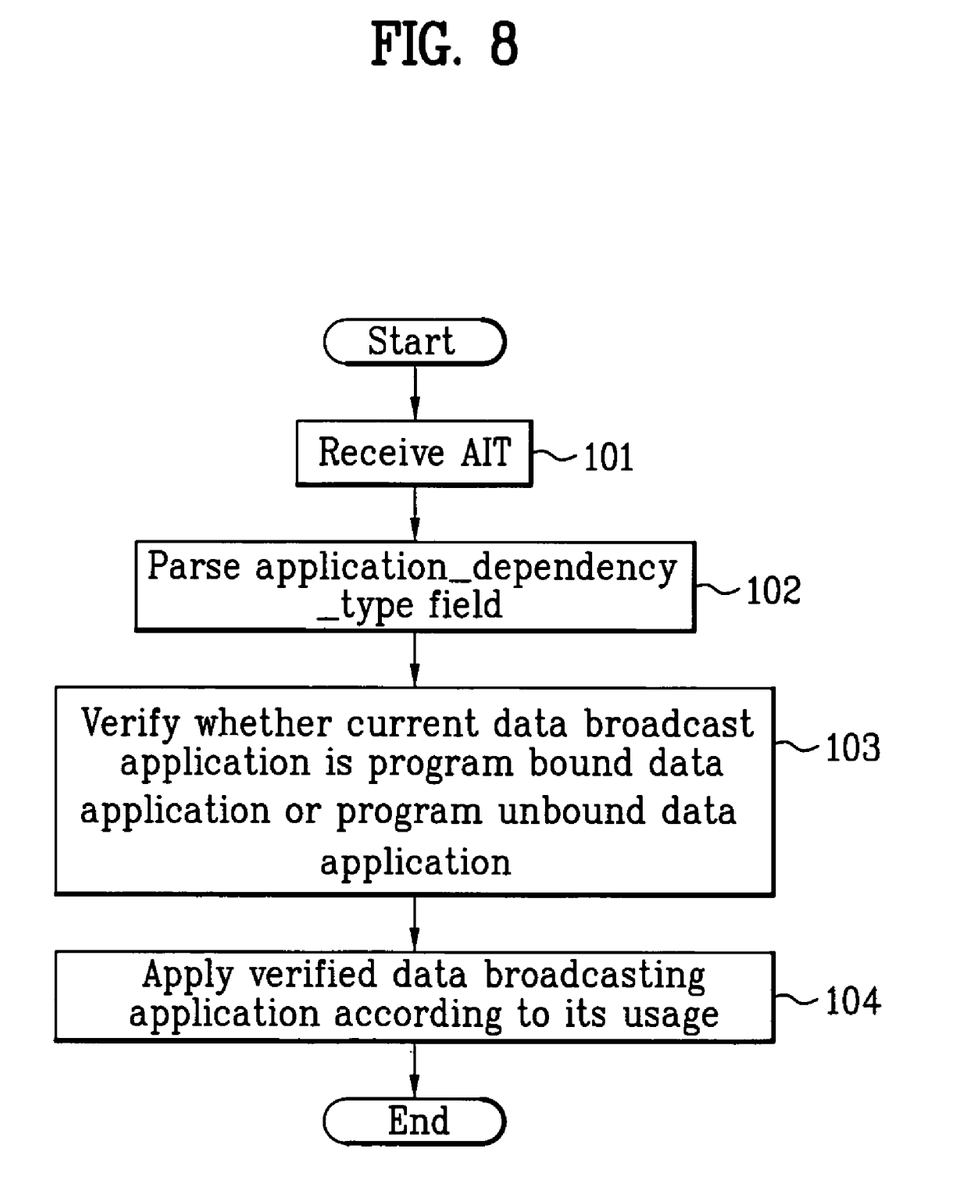
FIG. 8 illustrates a flow chart of a process of indicating a contents-based data broadcasting type from a data broadcasting receiver according to an embodiment of the present invention.

FIG. 8 illustrates a flow chart showing an example of a process of indicating a received data broadcasting type as a program-unbound type or a program-bound type by using the data broadcasting type indicating information from a receiver, when a contents-based data broadcasting type indicating information is written in a reserved field within the AIT and transmitted, as described in the first to third embodiments of the present invention. Referring to FIG. 8, when the AIT is received (S101), the application_dependency_type field is parsed (S102). Thereafter, when the field value is 0×1 (or 0×01), the corresponding data broadcast application is determined to be a program-unbound type, and when the field value is 0×2 (or 0×02), the corresponding data broadcast application is determined to be a program-bound type (S103). The data broadcast application type determined based on the contents of the application, in the above-described step (i.e., S103), is applied and used according to its pre-determined usage (S104).

Figure 9:
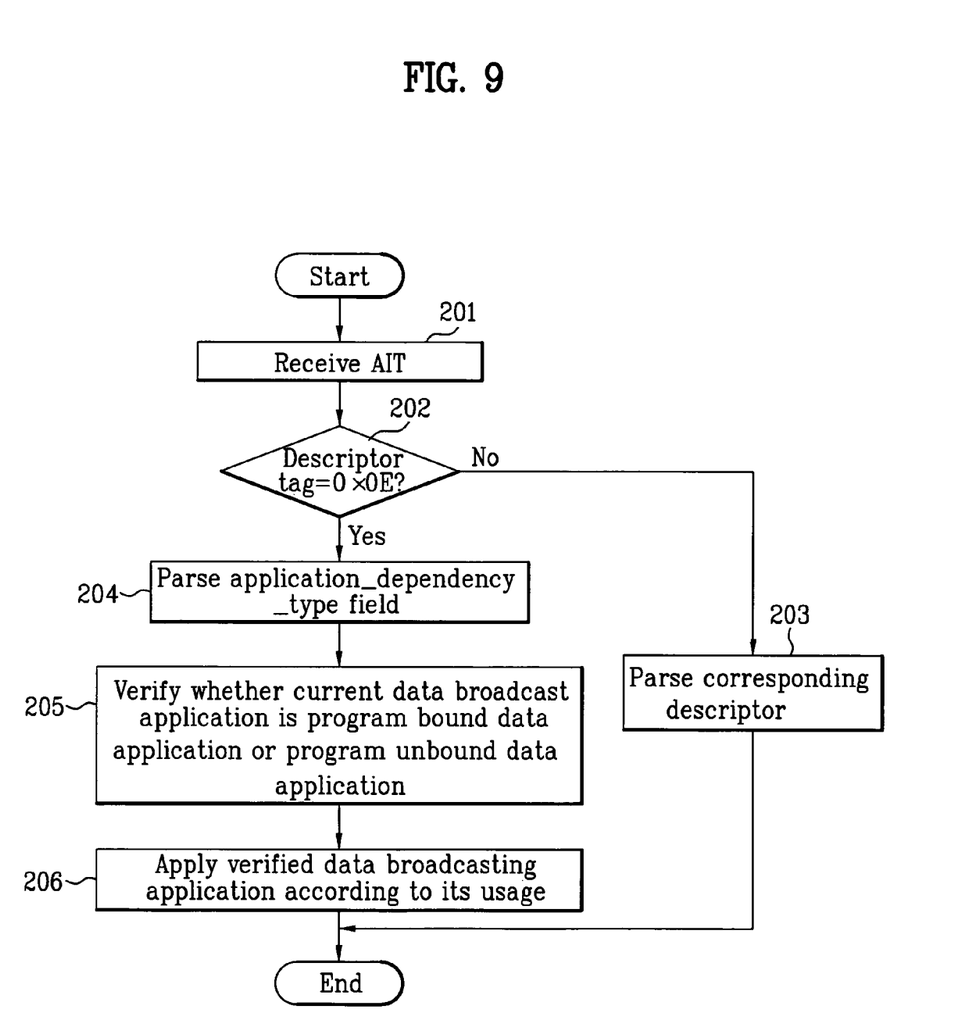
FIG. 9 illustrates a flow chart of a process of indicating a contents-based data broadcasting type from a data broadcasting receiver according to another embodiment of the present invention.

FIG. 9 illustrates a flow chart showing an example of a process of indicating a received data broadcasting type as a program-unbound type or a program-bound type by using the data broadcasting type indicating information from a receiver, when a descriptor is newly defined and a data broadcasting type indicating information is written in the newly defined descriptor and transmitted. More specifically, referring to FIG. 9, when the AIT is received (S201), the AIT is parsed so as to verify whether the current descriptor tag value is 0×0E (S202). If the descriptor tag value is determined not to be 0×0E in the previous step (i.e., S202), the current descriptor tag value indicates another descriptor. Therefore, the corresponding descriptor is parsed (S203). Conversely, if the descriptor tag value is determined to be 0×0E, then the current descriptor tag value indicates the Application dependency type descriptor( ). And so, Step 204 can be processed.

When the descriptor tag value is determined to be 0×0E in S202, the application_dependency_type field is parsed (S204). Thereafter, based on the parsed result, the current data broadcasting is determined to be either a program-bound type or a program-unbound type (S205). More specifically, when the application_dependency_type field value is 0×01, the corresponding data broadcast application is determined to be a program-unbound data broadcasting. And, when the field value is 0×02, the data broadcast application is determined to be a program-bound type. The data broadcasting determined based on the contents of S205 is then applied and used according to its pre-determined usage (S206).

Figure 10:
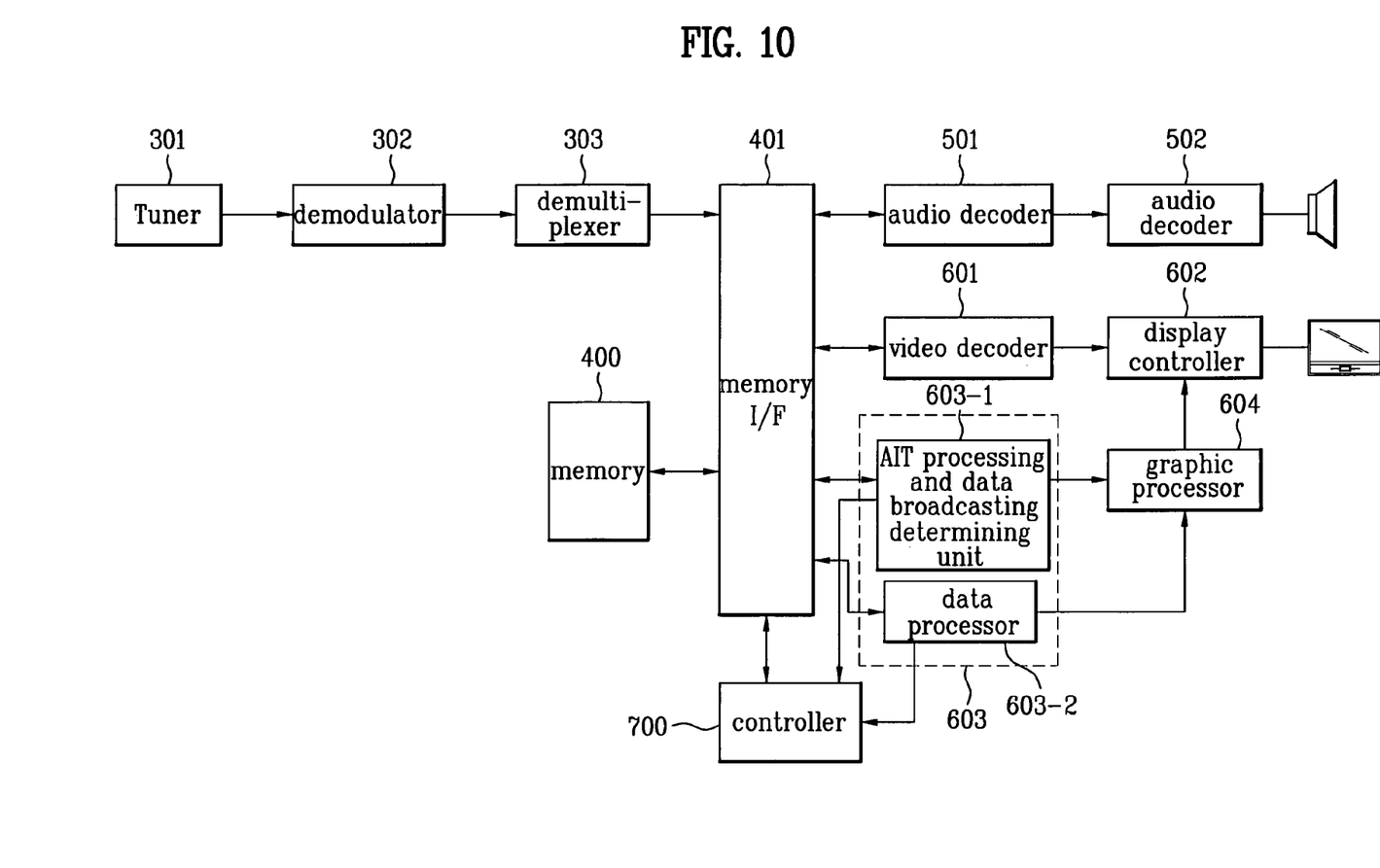
FIG. 10 illustrates a configuration block diagram of a data broadcasting receiver according to an embodiment of the present invention.

FIG. 10 illustrates a configuration block diagram of a data broadcasting receiver for receiving and processing data broadcasting type indicating information, when the contents-based data broadcasting type indicating information is created and transmitted from a transmitting end according to the first to third embodiments of the present invention. Referring to FIG. 10, the independent (program-unbound) data broadcasting application, such as broadcast programs, game, weather forecast, stock information, the program-bound data broadcast application associated with the broadcast program, and the AIT are sequentially processed through a tuner 301, a demodulator 302, a demultiplexer 303, and a memory interface (I/F) 304 and, then, stored in a memory 400.

More specifically, in accordance with controls of a controller 700, the tuner 301 tunes only a specific channel frequency selected by the user, among a plurality of channel frequencies received through one of an antenna, cable, and satellite. Then, the tuned channel frequency is transmitted to the demodulator 302. Herein, the tuned channel frequency may either contain only a broadcast program or a data broadcasting application, or contain both the broadcast program and the data broadcasting application. The demodulator 302 demodulates output signals of the tuner 301 in a reversed modulating method of the transmitter. Then, the demodulater 302 transmits the demodulated signal to the demultiplexer 303 in a transport stream form. The demultiplexer 303 refers to a Packet ID (PID) so as to separate audio/video/data streams from the demodulated stream. Then, the separated audio/video/data streams are stored in corresponding areas of the memory 400 through the memory interface (I/F) 401. At this point, the audio signal stored in the memory 400 is read and audio-decoded from an audio decoder 501 and, then, converted to an analog audio signal from an audio processor 502 and outputted to a speaker. Furthermore, a video signal stored in the memory 400 is read and video-decoded from a video processor 601 and, then, outputted to a display controller 602.

Meanwhile, a data decoder 603 broadly consists on an AIT processing and data broadcasting determining unit 603-1 and a data processor 603-2. The AIT stored in the memory 400 is read and decoded from the AIT processing and data broadcasting determining unit 603-1. Other data such as graphic format data stream, program guidance information, and so on are read and decoded from the data processor 603-2. And, whenever required, the above-described data may be stored once again in a memory within the controller 700 or the memory 400. More specifically, the AIT processing and data broadcasting determining unit 603-1 parses the read AIT and extracts data broadcast application information. Then, the AIT processing and data broadcasting determining unit 603-1 outputs the extracted data broadcast application information to the controller 700, thereby controlling the decoding and display of the data broadcasting.

In addition, when the transmitter creates and transmits a contents-based data broadcasting type indicating information within the AIT, the AIT processing and data broadcasting determining unit 603-1 is parsing the application_dependency_type field within the AIT (shown in FIG. 8 or FIG. 9) as described in the first to third embodiments of the present invention, thereby determining whether the received data broadcast application is a program-unbound application or a program-bound application. Thereafter, the determined result is transmitted to the controller 700. Accordingly, the controller 700 controls corresponding blocks so that various types of services can be provided and performed depending upon whether the data broadcast application is program-unbound or program-bound.

For example, the data broadcast application may be distinguished and stored as a program-unbound type and a program-bound type. Also, in case of the program-unbound data broadcasting, only the data may be stored from the receiver and viewed separately in a later process. Alternatively, in case of the program-bound data broadcasting, video/audio/data can be simultaneously stored, such as a PVR. In another example, the user may set up the program-unbound data broadcasting and the program-bound data broadcasting in accordance with the user's preference, thereby viewing only the program-unbound type (or the program-bound type) data. The operations of the AIT processing and data broadcasting determining unit 603-1 may either be performed only by using software or be performed by using a hardware configuration. Furthermore, the operations may also be performed by a combined use of both software and hardware.

Meanwhile, when the display of a graphic format data broadcasting is required, a graphic processor 604 processes the data decoded from one of the AIT processing and data broadcasting determining unit 603-1 and the data processor 603-2 to an On-Screen Display (OSD) type graphic, which is then transmitted to the display controller 602. The display controller 602 processes the video and data signals transmitted from the video decoder 601 and the graphic processor 604, respectively, to be applicable to a display device. Thereafter, the processed signals are transmitted for display.

More specifically, when only the broadcast program is displayed, the broadcast program transmitted from the video decoder 601 is processed to be applicable to the display device. Then, the processed broadcast program is transmitted and displayed onto a TV screen. Alternatively, when only the data broadcast application is displayed, the data broadcast application is processed to be applicable to the display device. Then, the processed data broadcast application is transmitted and displayed onto the TV screen. Furthermore, when the broadcast program and the data broadcast application are simultaneously displayed, the control of the display may vary depending upon whether the data broadcast application is overlapped with the broadcasting program and then displayed, and whether the broadcast program is to be reduced and displayed on a portion of the TV screen whereas the data broadcast application is to be displayed on the remaining portion of the TV screen. In this case, the display controller 602 receives the broadcast program and the data broadcast application from the video decoder 601 and the data decoder 603. Thereafter, the received program and application are received, and video-processing is performed in accordance with the display method.

As described above, the data structure for an application information table, the methods of transmitting and receiving a broadcast signal, and the digital television receiver have the following advantages. First of all, by distinguishing whether a received data broadcast application is a program-unbound data broadcast application or a program-bound data broadcasting application, various types of data broadcasting services may be provided to the users, thereby allowing the users to enjoy a wider selection of data broadcasting programs. In addition, by allowing only the program-unbound data broadcasting to be stored separately, diverse business items related to storage, displacement and re-usage of the stored data can be extensively created. Finally, by proposing and adopting the present invention to MHP, OCAP, and ACAP standards, a major turnover in the data broadcasting industry can be made.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of receiving a digital broadcast signal in a digital broadcast receiver, the method comprising:
   receiving a digital broadcast signal including an application information table (AIT), the application information table (AIT) comprising a set of application information associated with a data broadcast application, wherein the set of application information includes a first data field, the first data field having a first value when the data broadcast application is a bound application and having a second value when the data broadcast application is an unbound application;
   parsing the first data field included in the set of application information to obtain the value of the first data field that indicates whether the data broadcast application is bound to a specific broadcast program;
   controlling a storage of the data broadcast application based on a value of the first data field, wherein the data broadcast application is identified as a bound application or unbound application upon storage; and
   displaying a bound application separate from an unbound application based on a user command signal.

2. The method of claim 1, wherein the set of application information further includes an application identifier, an application control code, and a plurality of application descriptors.

3. The method of claim 1, wherein the bound application is terminated when the tuned channel is changed, and the unbound application keeps on operating regardless of the change of the channel.

4. The method of claim 1, wherein the set of application information includes a descriptor in which the first data field is included.

5. The method of claim 4, wherein the descriptor further includes a second data field indicating a descriptor tag and a third data field indicating a descriptor length.

6. The method of claim 4, wherein the descriptor comprises an application descriptor configured to indicate at least one of version, service bound, and priority information of the data broadcast application.

7. The method of claim 1, wherein a value of the first data field is set to '0' to indicate that the data broadcast application is a program-unbound application.

8. The method of claim 1, wherein the method further consists of storing within a storage unit the data broadcast application as a bound application or unbound application as indicated from the value of the parsed first data field.

9. The method of claim 1, wherein a bound application is an application which is associated with a currently tuned channel or a program of the channel, and an unbound application is an application which is not associated to the channel or the program.

10. A digital television (DTV) receiver, comprising:
a tuner configured to receive a digital broadcast signal;
a demodulator configured to demodulate the digital broadcast signal;
a storage unit;
a demultiplexer configured to demultiplex the demodulated signal into audio streams, video streams, and supplemental data streams;
a data processor configured to read an application information table (AIT) from the demultiplexed supplemental data streams, the application information table (AIT) comprising a set of application information associated with a data broadcast application, wherein the set of application information includes a first data field, the first data field having a first value when the data broadcast application is a bound application and having a second value when the data broadcast application is an unbound application, the data processor further parses the first data field to obtain the value of the first data field;
a controller to control a termination of the data broadcast application based on a value of the first data field when a channel is changed and control a storage of the data broadcast application so that the data broadcast application is identified as a bound application or unbound application upon a storage in the storage unit; and
a display controller configured to display a bound application separate from an unbound application based on a user command signal.

11. The digital television (DTV) receiver of claim 10, wherein the set of application information further includes an application identifier, an application control code, and a plurality of application descriptors.

12. The digital television (DTV) receiver of claim 10, wherein the bound application is terminated when the tuned channel is changed, and the unbound application keeps on operating regardless of the change of the channel.

13. The digital television (DTV) receiver of claim 10, wherein the set of application information includes a descriptor in which the first data field is included.

14. The digital television (DTV) receiver of claim 13, wherein the descriptor further includes a second data field indicating a descriptor tag and a third data field indicating a descriptor length.

15. The digital television (DTV) receiver of claim 13, wherein the descriptor comprises an application descriptor configured to indicate at least one of version, service bound, and priority information of the data broadcast application.

16. The digital television (DTV) receiver of claim 10, wherein a value of the first data field is set to '0' in order to indicate that the data broadcast application is independent of any broadcast program.

17. The digital television (DTV) receiver of claim 10, further comprising a memory configured to store the application information table (AIT) which is read from the data processor.

18. The digital television (DTV) receiver of claim 10, wherein the data processor stores the data broadcast application in the storage unit as a bound application or unbound application as indicated from the value of the first data field.

19. The digital television (DTV) receiver of claim 10, wherein a bound application is an application which is associated with a currently tuned channel or a program of the channel, and an unbound application is an application which is not associated to the channel or the program.

20. A method of receiving a digital broadcast signal in a digital broadcast receiver, the method comprising:
receiving a digital broadcast signal including an application information table (AIT), the application information table (AIT) comprising a set of application information associated with a data broadcast application, wherein the set of application information includes a first data field having a first value when the data broadcast application is a bound application and a second value when the data broadcast application is an unbound application, wherein the bound application is an application which is associated with a currently tuned channel or a program of the channel, and the unbound application is an application which is not associated to the channel or the program;
parsing the first data field included in the set of application information to obtain the value of the first data field that indicates whether the data broadcast application is bound to a specific broadcast program;
displaying a bound application separate from an unbound application based on a user command signal; and
controlling a storage within a storage unit to store the data broadcast application as a bound application or unbound application as indicated from the value of the parsed first data field, wherein the data broadcast application is stored separately to be displayed when the data broadcast application is an unbound application.

21. A digital television (DTV) receiver, comprising:
a tuner configured to receive a digital broadcast signal;
a demodulator configured to demodulate the digital broadcast signal;
a storage unit;
a demultiplexer configured to demultiplex the demodulated signal into audio streams, video streams, and supplemental data streams;
a data processor configured to read an application information table (AIT) from the demultiplexed supplemental data streams, the application information table (AIT) comprising a set of application information associated with a data broadcast application, wherein the set of application information includes a first data field having a first value when the data broadcast application is a bound application and a second value when the data broadcast application is an unbound application, the data processor further parses the first data field to obtain the value of the first data field, the data processor further stores the data broadcast application in the storage unit as a bound application or unbound application as indicated from the value of the first data field, wherein the data broadcast application is stored separately to be displayed when the data broadcast application is an unbound application; and
a display controller configured to display a bound application separate from an unbound application based on a user command signal.

* * * * *